United States Patent [19]
Johnson et al.

[11] Patent Number: 5,874,963
[45] Date of Patent: Feb. 23, 1999

[54] METHOD AND SYSTEM FOR CURSOR APPLIED PROCESSING WITHIN A DATA PROCESSING SYSTEM

[75] Inventors: William J. Johnson, Flower Mound; Michael Dean Smith, Irving, both of Tex.

[73] Assignee: International Business Machines Corporation, Armonk, N.Y.

[21] Appl. No.: 160,348

[22] Filed: Dec. 1, 1993

[51] Int. Cl.$^6$ ..................................................... G06F 15/00
[52] U.S. Cl. .......................... 345/348; 345/349; 345/352; 345/145
[58] Field of Search ............................ 395/159; 345/348, 345/349, 352, 145

[56] References Cited

U.S. PATENT DOCUMENTS 4,939,507  7/1990  Beard et al. ............................. 395/159

OTHER PUBLICATIONS

Robert Cowart, "Mastering Window 3.1", 1992–1993, pp. 421–428, 740–741, 834–836.

*Primary Examiner*—Ba Huynh
*Attorney, Agent, or Firm*—Edward H. Duffield; Andrew J. Dillon

[57] ABSTRACT

A method and system for efficiently executing a predefined process within a data processing system having multiple objects and a movable cursor element displayed therein. A user defined executable process is specified within the data processing system which may be applied to one or more arbitrary objects within the data processing system. The user defined executable process is then associated with the movable cursor within the data processing system. Thereafter, each time an object is graphically selected within the data processing system utilizing the movable cursor, the user defined executable process is applied to the selected object. The physical appearance of the movable cursor is preferably altered to indicate the association of the user defined executable process with the movable cursor and an error message is returned in response to a selection of an object which cannot be processed utilizing the user defined executable process.

8 Claims, 5 Drawing Sheets

5,874,963

METHOD AND SYSTEM FOR CURSOR APPLIED PROCESSING WITHIN A DATA PROCESSING SYSTEM

BACKGROUND OF THE INVENTION

1. Technical Field

The present invention relates in general to an improved data processing system and in particular to a method and system for efficiently executing a predefined process within a data processing system. Still more particularly, the present invention relates to a graphical technique for executing a predefined process within the data processing system.

2. Description of the Related Art

Data processing systems are becoming increasingly complex as technology and software become more complicated. As the complexity of such systems increases, it is of increasing importance to simplify the interface between a user and the data processing system in order to render execution of selected tasks within the data processing system more efficient, if possible.

Recently selected software applications have been created which support the creation and utilization of user defined macros that may be applied within some context of that application. For example, modern word processing applications often permit a user to enter a "record" mode and thereafter specify a series of procedural steps which are to be recorded and executed each time the user invokes that macro. While such systems permit a user to define a macro or batch file for execution within a particular context of an application, no such procedure exists which permits a user to define a user specified process which may be applied to any number of arbitrarily selected user interface objects, such as icons, files, documents or the like, in an application independent manner.

One reason that such known user defined macros are limited to a single context is the difficulty in specifying the manner in which the predefined processes which make up the macro are to be applied to a particular object within the data processing system. It should thus be apparent that a need exists for a technique whereby iterative processing of objects within an electronic desktop may be efficiently performed and applied to an arbitrary object within a data processing system.

SUMMARY OF THE INVENTION

It is therefore one object of the present invention to provide an improved data processing system.

It is another object of the present invention to provide an improved method and system for efficiently executing a predefined process within a data processing system.

It is yet another object of the present invention to provide a graphical technique for executing a predefined process upon an arbitrary user interface object within a data processing system.

The foregoing objects are achieved as is now described. The method and system of the present invention may be utilized to efficiently execute a predefined process within a data processing system having multiple objects and a movable cursor element displayed therein. A user defined executable process is specified within the data processing system which may be applied to one or more arbitrary objects within the data processing system. The user defined executable process is then associated with the movable cursor within the data processing system. Thereafter, each time an object is graphically selected within the data processing system utilizing the movable cursor, the user defined executable process is applied to the selected object. The physical appearance of the movable cursor is preferably altered to indicate the association of the user defined executable process with the movable cursor and an error message is returned in response to a selection of an object which cannot be processed utilizing the user defined executable process.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a Preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
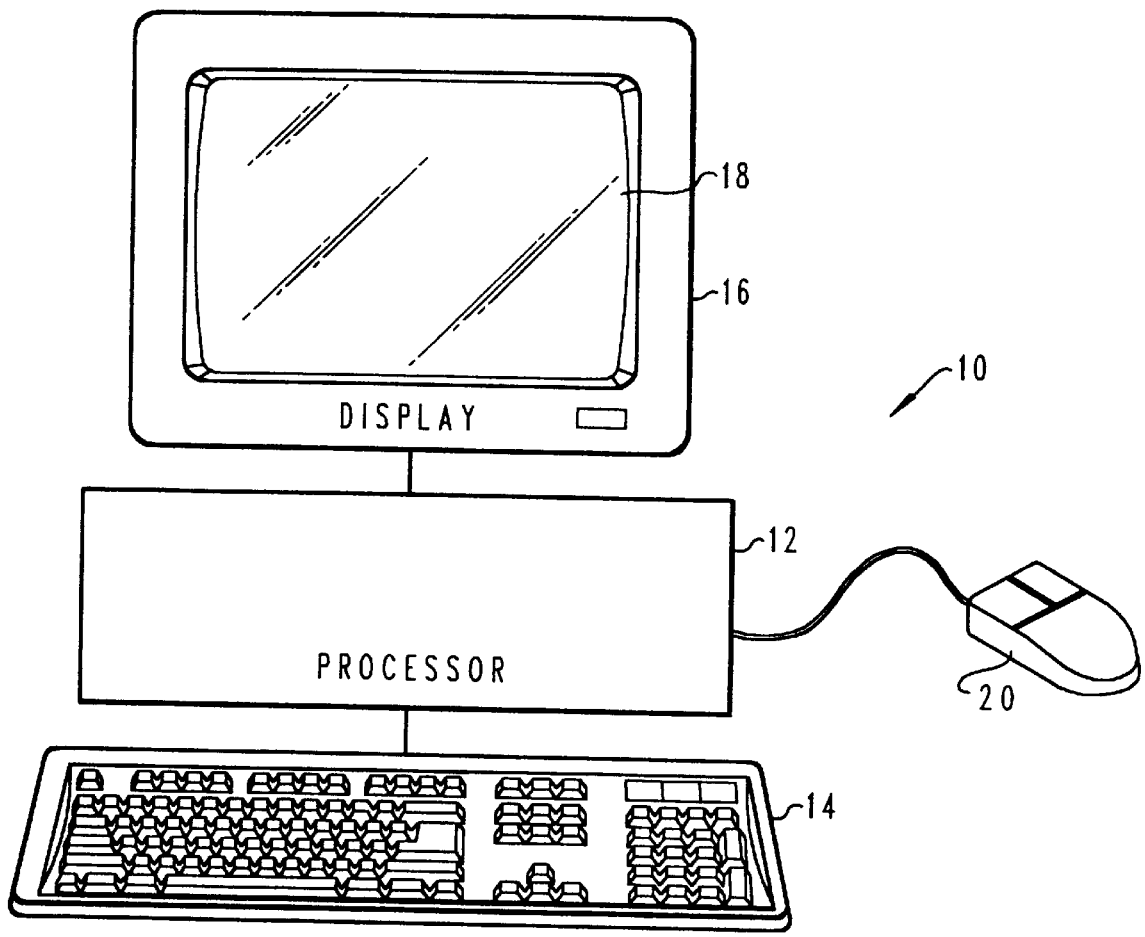
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As illustrated, data processing system 10 includes a processor 12 and a keyboard 14. As is typical in such data processing systems, a display device 16 is also coupled to processor 12 and includes a display screen 18. A graphic pointing device 20, such as a mouse pointer, is also coupled to processor 12 and may be utilized, as those skilled in the art will appreciate, to graphically select an element within display screen 18 in a manner well known in the art. Data processing system 10 may be implemented utilizing any so-called "personal" computer, such as the International Business Machines Corporation PS/2 personal computer.

Figure 2:
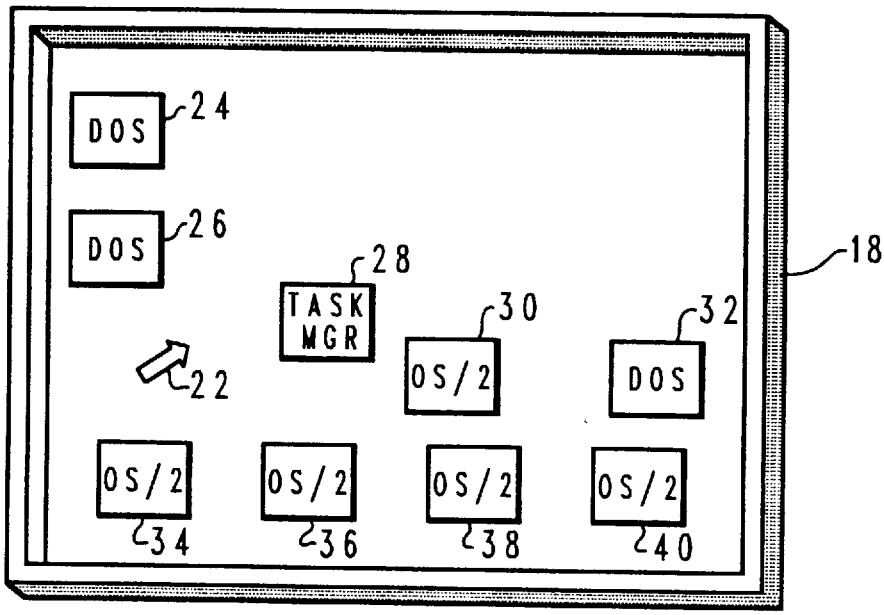
FIG. 2 is a pictorial representation of a display screen within the data processing system of FIG. 1 which illustrates the display of a movable cursor and multiple user selectable objects which may be operated upon utilizing the method and system of the present invention.

Referring now to FIG. 2, there is depicted a pictorial representation of a display screen 18 within data processing system 10 of FIG. 1 which illustrates the display of a movable mouse cursor 22 and multiple user selectable objects which may be operated upon utilizing the method and system of the present invention. As illustrated, multiple user selectable objects 24, 26, 28, 30, 32, 34, 36, 38, and 40 are displayed within display screen 18. Such user selectable objects may comprise iconic representations of documents, files, folders, or the like. Similarly, those skilled in the art will appreciate that such user selectable objects may also comprise iconic representations of selected applications or utilities within data processing system 10. Each user selectable object within display screen 18 may, as those ordinarily skilled in the art will appreciate, be graphically selected, utilizing graphic pointing device 22 by physically locating movable mouse cursor 22 above a particular user selectable object and thereafter "clicking" or otherwise selecting the object utilizing a mouse button or other similar input device.

Figure 3:
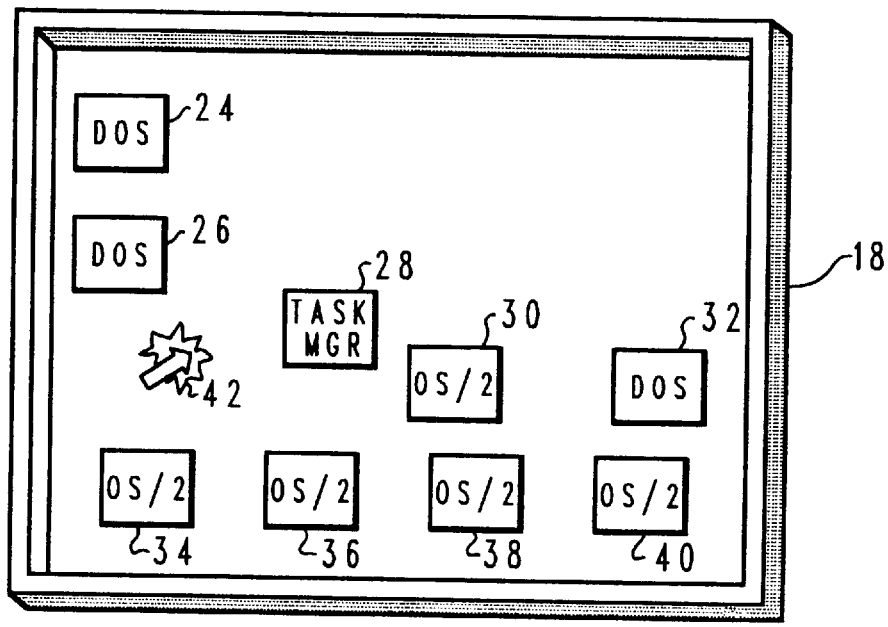
FIG. 3 is a pictorial representation of a display screen within the data processing system of FIG. 1 which illustrates the display of a movable cursor which has been graphically altered in appearance in response to an association of a user defined process with the movable cursor in accordance with the method and system of the present invention.

With reference now to FIG. 3, there is depicted a pictorial representation of display screen 18 of FIG. 2 within data processing system 10 of FIG. 1 which illustrates the display of a movable cursor which as been graphically altered in appearance in response to an association of a user defined process with the movable cursor in accordance with the method and system of the present invention. As illustrated, the appearance of movable mouse cursor 22 has been graphically altered and is now depicted as graphically altered mouse cursor 42. Those having ordinary skill in this art will appreciate that any suitable graphical technique for indicating the association of a user defined process may be utilized to indicate that association and that the shape, color or physical appearance of movable mouse cursor 22 may be suitably altered to indicate that association. In the depicted embodiment of the present invention, the user defined process may comprise, for example, a specification of a particular series of alphanumeric characters which are to be searched for within a file listing represented by a selectable object within display screen 18.

Thus, if the user desires to examine each user selectable object within display screen 18 to locate each file or document having the letters "P," "R," "O," "L," within the file name, a simple procedure may be defined for specifying that process. In a manner which will be explained in greater detail herein, that user defined process may be created and stored and thereafter selected for association with movable mouse cursor 22 to create graphically altered mouse cursor 42 in the manner depicted within FIG. 3.

Figure 4:
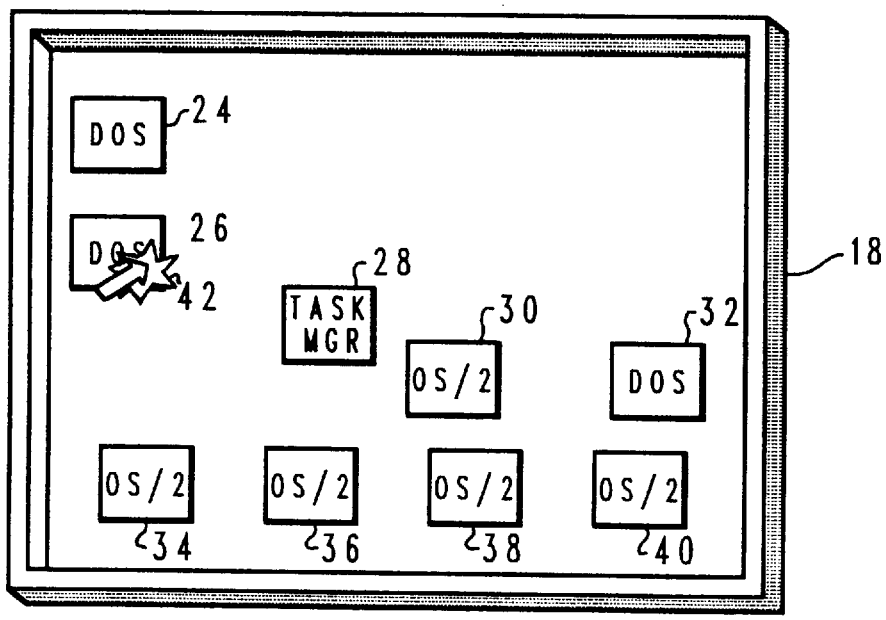
FIG. 4 is a pictorial representation of the display screen within the data processing system of FIG. 1 which illustrates the display of a graphically altered movable cursor and the graphic selection of a particular user selectable object in accordance with the method and system of the present invention.

Next, referring to FIG. 4, there is depicted a pictorial representation of display screen 18 within data processing system 10 of FIG. 1, which illustrates the display of a graphically altered movable cursor and a graphic selection of a particular user selectable object in accordance with the method and system of the present invention. Thus, as illustrated within FIG. 4, graphically altered mouse cursor 42 has been moved to a position overlying user selectable object 26. In this manner, as will be explained in greater detail below, the user defined process associated with graphically altered mouse cursor 42 will then be applied to user selectable object 26 upon the graphic selection of user selectable object 26, utilizing graphically altered mouse cursor 42. Thus, the graphic selection and "clicking" on user selectable logic 26 utilizing graphically altered mouse cursor 42 will result in the execution of the selected user defined process on the contents of that user selectable object.

Figure 5:
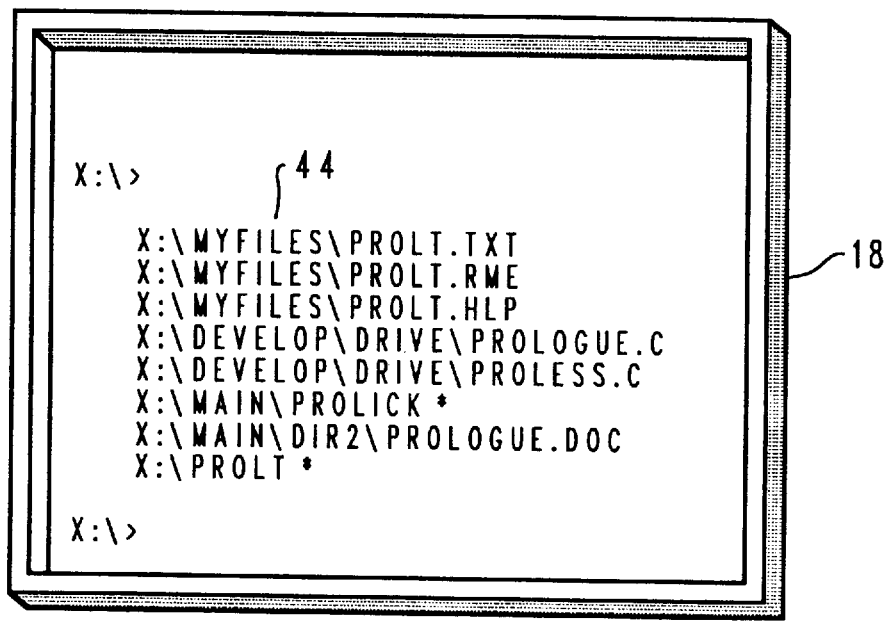
FIG. 5 is a pictorial representation of a display screen which illustrates the display of a result of an execution of the user defined process upon the graphically selected user selectable object in accordance with the method and system of the present invention.

With reference now to FIG. 5, there is depicted a pictorial representation of a display screen 18 within data processing system 10 of FIG. 1, which illustrates the display of a result of an execution of the user defined process upon the graphically selected user selectable object, in accordance with the method and system of the present invention. Thus, as illustrated within FIG. 5, a search results listing 44 has been created which lists each file within user selectable object 26 which satisfies the search criteria set forth within the predefined process which has been selected by the user.

In this manner, as those ordinarily skilled in the art will appreciate, a user predefined process may be created and associated with a movable mouse cursor and thereafter executed upon any arbitrarily selected object within the data processing system by the simple expedient of graphically selecting a user selectable object utilizing the graphically altered mouse cursor. Of course, in the event the object selected is inappropriate for execution of the user defined process, an error message may be generated and returned to the user.

Figure 6:
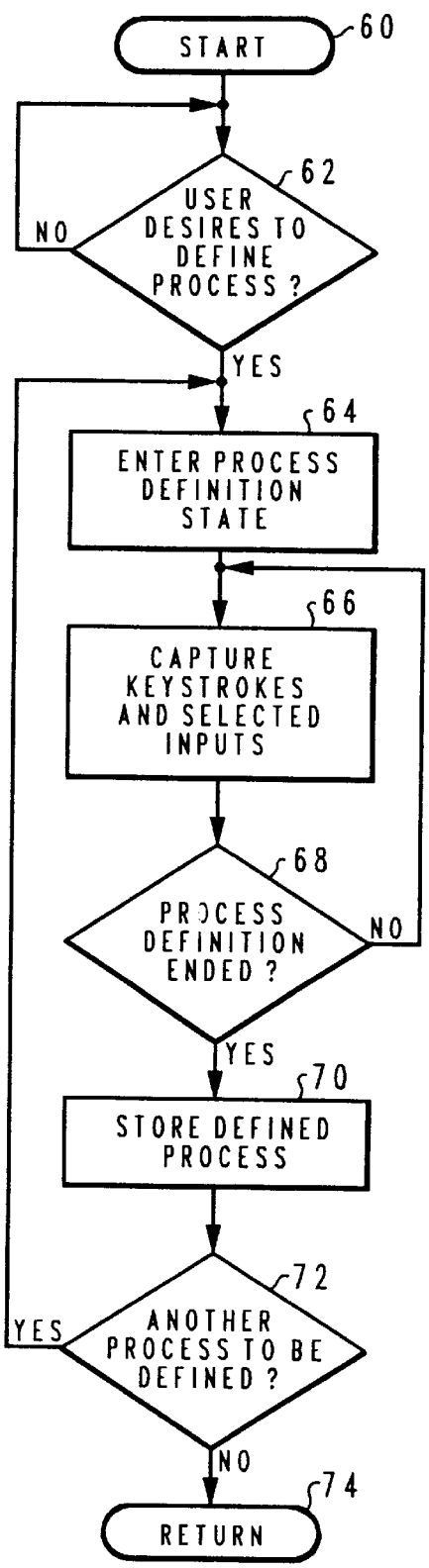
FIG. 6 is a high level logic flowchart which illustrates the specification of a user defined process to be utilized in accordance with the method and system of the present invention.

Referring now to FIG. 6, there is depicted a high level logic flowchart which illustrates the specification of a process to be utilized with the method and system of the present invention. As depicted, the process begins at block 60 and thereafter passes to block 62. Block 62 illustrates a determination of whether or not the user desires to define a process and if not, the process merely returns in an iterative fashion to await the initiation of the creation of a user defined process in accordance with the method and system of the present invention.

Still referring to block 62, in the event the user does desire to define a process, the process passes to block 64. Block 64 illustrates the entering of a process definition state. Those ordinarily skilled in the art will appreciate that a procedure may be created for specifying process definition and executed utilizing a so-called "Terminate and Stay Resident" (TSR) processing technique. That is, a process which is initiated utilizing a so-called "hot key" and which thereafter interprets keystrokes which follow the invocation of that procedure as keystrokes which are to be recorded for future utilization, rather than passed directly to the data processing system.

Next, the process passes to block 66 which illustrates the capture and storing of the keystrokes and other selected inputs, such as mouse movements or the like. Thereafter, the process passes to block 68. Block 68 illustrates a determination of whether or not the process definition has ended and if not, the process returns to block 66 to continue to capture keystrokes and selected user inputs.

Once the process definition has ended, as determined at block 68, the process passes to block 70. Block 70 illustrates the storing of the defined process and the process then passes to block 72. Block 72 illustrates a determination of whether or not a second user defined process is to be defined and if so, the process returns to block 64 in an iterative fashion to begin the process definition procedure for a second user defined process. In the event no other process is to be defined, this p11 passes 11 passes to block 74 and returns. A user may desire to utilize existing processes, such as macros, batch files, programs or the like. In such circumstances, the process detailed in FIG. 6 will not be necessary.

Figure 7:
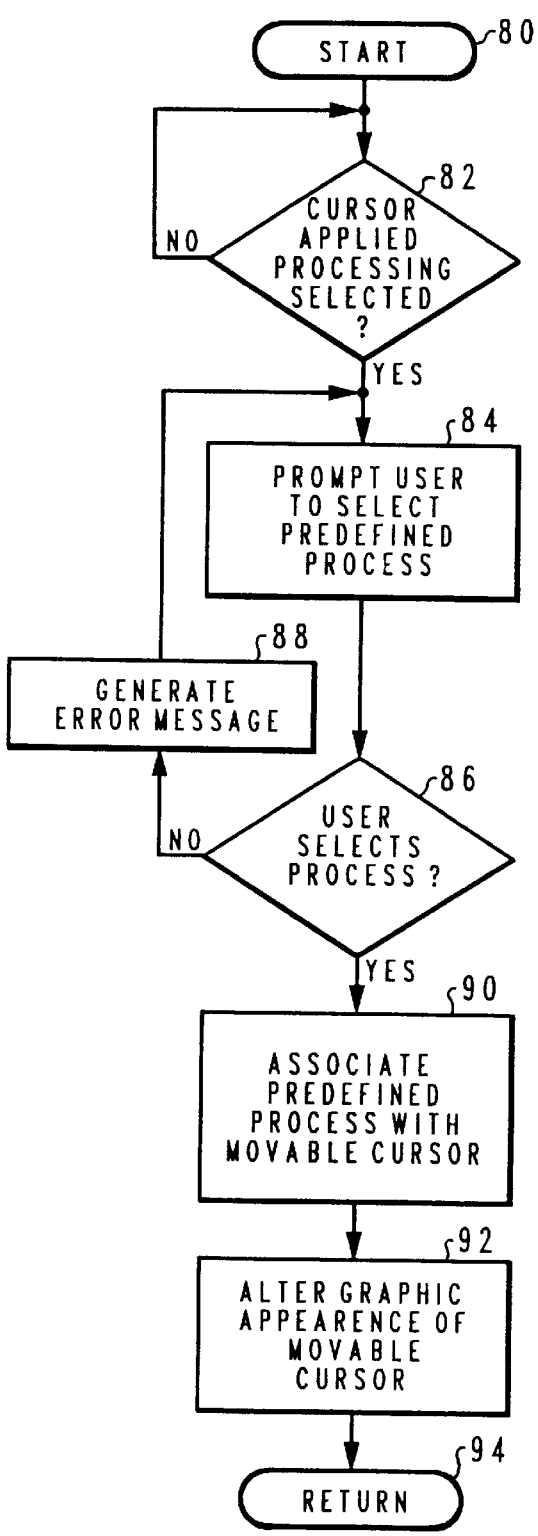
FIG. 7 is a high level logic flowchart which illustrates the association of a user defined process with a movable cursor in accordance with the method and system of the present invention.

With reference now to FIG. 7, there is depicted a high level logic flowchart which illustrates the association of a user defined process with a movable cursor in accordance with the method and system of the present invention. As illustrated, this process begins at block 80 and thereafter passes to block 82. Block 82 illustrates a determination of whether or not cursor applied processing has been selected. If not, the process merely iterates until such time as the user selects a cursor applied processing procedure. Once the cursor applied processing procedure has been selected, the process passes to block 84. Block 84 illustrates the prompting of the user to select a predefined process. Recalling that the user may predefine and store numerous processes, it should be clear to those having ordinary skill in the art that the user may select one of several predefined processes for utilization with the cursor applied processing process. It should be noted that a reference to one or more existing processes such as macros, batch files, programs or the like, may be utilized in lieu of the creation of a process as outlined in FIG. 6 above. Next, the process passes to block 86. Block 86 illustrates a determination of whether or not the user has responded to the prompt by selecting a predefined process. If not, the process passes to block 88 which illustrates the generation of an error message and the process returns to block 84 in an iterative fashion.

Still referring to block 86, in the event the user has selected a predefined process for utilization with the cursor applied processing procedure, the process passes to block 90. Block 90 illustrates the association of that predefined process with the movable cursor. Next, the process passes to block 92 which illustrates the alteration of the graphical appearance of the movable cursor in order to indicate to the user that a predefined process has been associated with that cursor. Thereafter, the process passes to block 94 and returns. Error handling of an invalidly specified process may be accomplished utilizing any technique known in the art.

Figure 8:
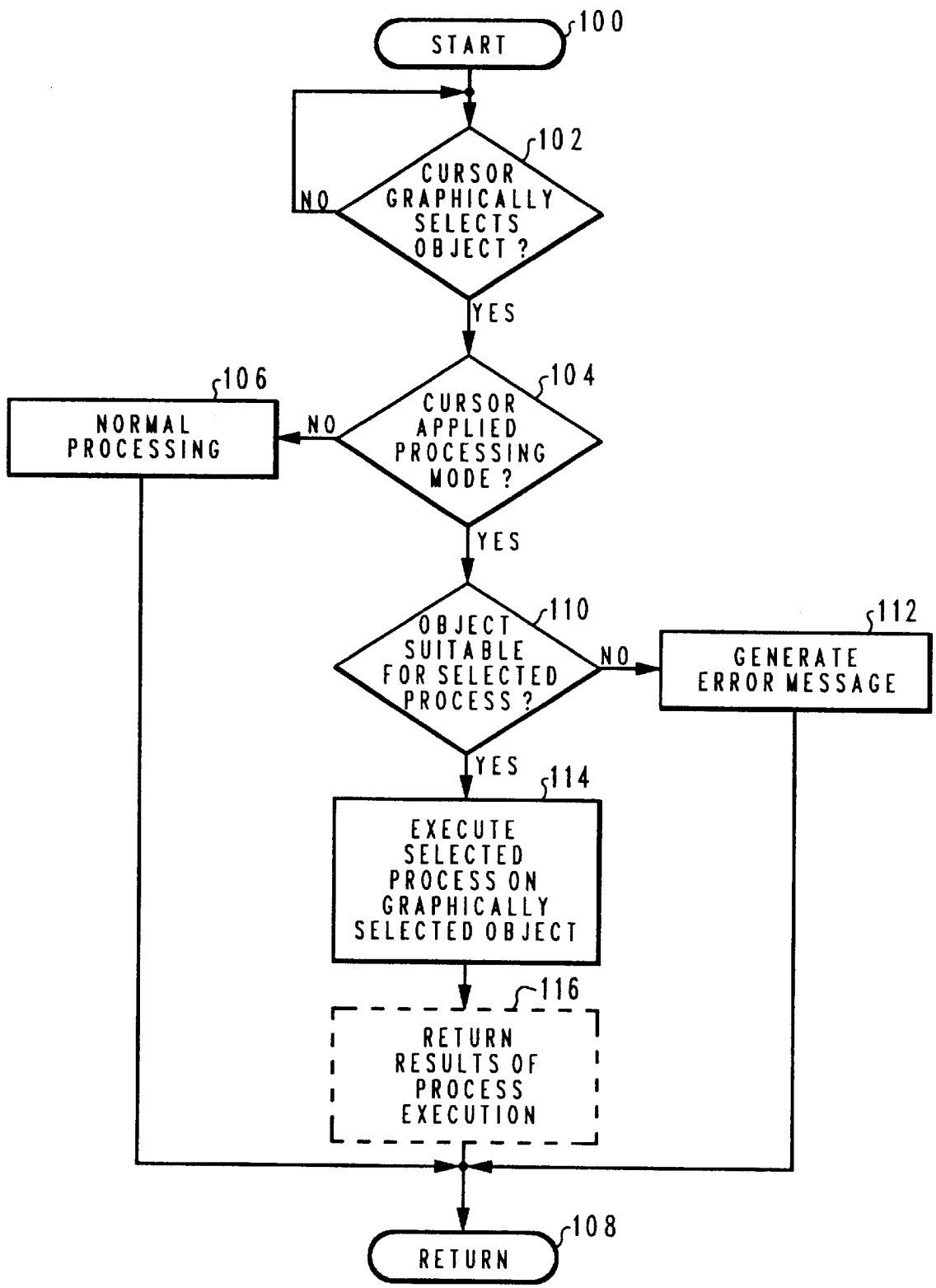
FIG. 8 is a high level logic flowchart which illustrates the execution of a user defined process upon a particular user selectable object in response to a graphic selection of the object by a user utilizing a movable cursor in accordance with the method and system of the present invention.

Finally, referring to FIG. 8, there is depicted a high level logic flowchart which illustrates the execution of a user defined process upon a particular user selectable object in response to a graphic selection of that object by a user utilizing the movable cursor, in accordance with the method and system of the present invention. As illustrated, this process begins at block 100 and thereafter passes to block 102. Block 102 illustrates a determination of whether or not the cursor has been utilized to graphically select an object within display screen 18. In the event the cursor has not been utilized to select an object, the process returns, in an iterative fashion, to await selection by the user of an object within the display screen utilizing the movable mouse cursor. Next, the process passes to block 104.

Block 104 illustrates a determination of whether or not the system is currently operating within the cursor applied processing mode and if not, the process passes to block 106 which illustrates the normal selection procedure. That is, that procedure which occurs normally when an object which has been graphically selected by the cursor is selected during normal processing. Thereafter, the process passes to block 108 and returns.

Referring again to block 104, in the event the data processing system is operating within the cursor applied processing mode, the process passes to block 110. Block 110 illustrates a determination of whether or not the object which has been selected is suitable for the selected predefined process. Those ordinarily skilled in the art will appreciate that in view of the fact that numerous user processes may be predefined, there may exist selectable objects within the data processing system which are not suitable for execution by a particular process. In the event the object selected is not suitable for the selected process, the process passes to block 112 which illustrates the generation of an error message. Thereafter, the process passes to block 108 and returns.

Referring again to block 110, in the event the object selected by the user utilizing the mouse cursor is suitable for the selected process, the process passes to block 114 which illustrates the execution of the selected process on the graphically selected object in response to a graphic selection of that object utilizing the movable mouse cursor. Next, the process passes to optional block 116 which illustrates the returning and display of the results of that process execution, if necessary or desired, and the process then passes to block 108 and returns.

The movable mouse cursor, of course, remain enabled within the cursor applied processing mode after selection of that mode as noted in FIG. 7 until the user elects to disable that mode. After disabling the cursor applied processing mode, the appearance of the movable mouse cursor will be restored to a normal graphic appearance and will thereafter operate normally.

Upon reference to the foregoing those skilled in the art will appreciate that the Applicants herein have created an intuitive and graphic technique whereby a user defined process may be created and thereafter associated with a movable cursor element and then applied to an arbitrary number of user selectable objects within a data processing system by the simple expedient of graphically selecting an object utilizing a movable cursor which has had a predefined user process associated therewith.

While the invention has been particularly shown and described with reference to a preferred embodiment, it will be understood by those skilled in the art that various changes in form and detail may be made therein without departing from the spirit and scope of the invention.

We claim:

1. A graphic method for efficient execution of a predefined process within a data processing system having a keyboard, a plurality of objects and a movable cursor displayed therein, said method comprising the steps of:

specifying a predefined process within said data processing system, said predefined process comprising a plurality of keystrokes, said plurality of keystrokes specifying a user defined executable process which may be applied to one or more objects within said data processing system;

associating said predefined process with said movable cursor within said data processing system;

altering a graphic appearance of said movable cursor in response to said association of said predefined process with said movable cursor; and executing said predefined process on a particular object within said data processing system in response to a graphic selection of said particular object by a user utilizing said movable cursor.

2. The graphic method for the efficient execution of a predefined process within a data processing system according to claim 1, further including the step of determining if said predefined process may be executed on said particular object in response to a graphic selection of said particular object by a user utilizing said movable cursor.

3. The graphic method for the efficient execution of a predefined process within a data processing system according to claim 2, further including the step of generating an error message in response to a determination that said predefined process may not be executed on said particular object.

4. The graphic method for the efficient execution of a predefined process within a data processing system according to claim 1, wherein said data processing system includes a graphical pointing device and wherein said step of executing said predefined process on a particular object within said data processing system in response to a graphic selection of said particular object by a user utilizing said movable cursor comprises the step of executing said predefined process on a particular object within said data processing system in response to a graphic selection of said particular object by a user utilizing said graphical pointing device to relocate said movable cursor.

5. A system for efficient execution of a predefined process within a data processing system having a keyboard, a plurality of objects and a movable cursor displayed therein, said system comprising:

means for specifying a predefined process within said data processing system said predefined process comprising a plurality of keystrokes, said plurality of keystrokes specifying a user defined executable process which may be applied to one or more objects within said data processing system;

means for associating said predefined process with said movable cursor within said data processing system;

means for altering a graphic appearance of said movable cursor in response to said association of said predefined process with said movable cursor: and means for executing said predefined process on a particular object within said data processing system in response to a graphic selection of said particular object by a user utilizing said movable cursor.

6. The system for the efficient execution of a predefined process within a data processing system according to claim 5, further including means for determining if said predefined process may be executed on said particular object in response to a graphic selection of said particular object by a user utilizing said movable cursor.

7. The system for the efficient execution of a predefined process within a data processing system according to claim 6, further including means for generating an error message in response to a determination that said predefined process may not be executed on said particular object.

8. The system for the efficient execution of a predefined process within a data processing system according to claim 5, wherein said data processing system includes a graphical pointing device for relocating said movable cursor.

* * * * *